United States Patent

Lothar

[15] 3,656,785
[45] Apr. 18, 1972

[54] HUB-TO-SHAFT CONNECTION
[72] Inventor: Peter Lothar, Guglingen, Wurtt, Germany
[73] Assignee: Oskar E. Peter, Brackenheim, Germany
[22] Filed: Dec. 7, 1970
[21] Appl. No.: 95,763

[30] Foreign Application Priority Data

Mar. 14, 1970   Germany............... P 20 12 256.9

[52] U.S. Cl. .......................................... 287/52.06, 287/53
[51] Int. Cl. .......................................................... F16d 1/06
[58] Field of Search ..................... 287/53, 52, 52.06, 52.09; 279/2; 82/44; 85/67, 79

[56] References Cited

UNITED STATES PATENTS

| | | | |
|---|---|---|---|
| 1,120,409 | 12/1914 | Rohmer et al. | 85/67 |
| 1,648,032 | 11/1927 | Starkin | 279/2 UX |
| 2,574,773 | 11/1951 | Bannister | 287/53 R |
| 2,691,541 | 10/1954 | Benedek | 287/52.06 |

FOREIGN PATENTS OR APPLICATIONS

| 992,542 | 5/1965 | Great Britain | 85/79 |
|---|---|---|---|
| 1,178,261 | 9/1964 | Germany | 287/52.06 |
| 1,211,447 | 2/1966 | Germany | 287/52.09 |

Primary Examiner—Andrew V. Kundrat
Attorney—Flynn & Frishauf

[57] ABSTRACT

A frustro-conical holding ring is adapted to seat on a shaft; a closed outer holding ring having an internal frustro-conical surface seats and surrounds the first holding ring. To center these rings on the shaft and within the hub, cylindrical centering rings adapted to seat against the inner surface of the hub and on the shaft are formed adjacent the thicker ends of each of said rings, the cylindrical centering rings extending over a radial distance greater than the thickness of the thickened end to overlap the thinner end of the other ring, and center the holding rings on the shaft and within the hub. Disks of elastic material, such as rubber or plastic disks may be located between the end faces of a holding ring and the inner end face of the centering ring adapted to fit thereagainst to form an elastic and sealing insert. The entire arrangement can be tightened by relative axial shifting of the two holding rings against each other, for example by circumferentially arranged holding screws, a central screw with an interposed disk spring or the like. The center rings may be radially slitted, the radial slits extending into the holding rings.

8 Claims, 3 Drawing Figures

PATENTED APR 18 1972 3,656,785

3,656,785

HUB-TO-SHAFT CONNECTION

The present invention relates to a connecting arrangement to interconnect a hub on a shaft, and more particularly to such an interconnecting arrangement which is capable of transmitting a substantial torque, in which matching, conical surfaces are arranged adjacent each other.

Means to secure a hub to a shaft which include longitudinally slitted inner and outer rings are known. The rings form matching tension rings which have corresponding conical, or frustro-conical surfaces, and they are held tightened against each other by holding screws, arranged around the circumference of the rings similar to the planet gears in a planetary drive. The screws are capable of slightly sliding the tension rings against each other so that radial forces will arise to provide effective power transfer, without slippage, between the shaft and the hub, and to transfer substantial torques. One disadvantage of such an arrangement is that the conical surfaces which heretofore have been stepped require extremely accurate workmanship. It is very difficult, and almost impossible to make four corresponding conical surfaces so accurately, that they will transmit power throughout their surface. This, however, is necessary to transmit the maximum of power and to provide for perfectly centered and balanced operation. The practically unavoidable inaccuracies, arising during manufacture, unfavorably affect the torque which can be transmitted, the centricity, and thus the dynamic balance additionally, it is difficult to determine the torque by calculation to provide design criteria. An additional and substantial disadvantage of stepped conical surfaces in the tension rings of such hub securing arrangements is, that the cross-sectional area thereof must be made quite large, so that the space required by the coupling between shaft and hub becomes rather substantial. For many applications, the required space is not available. The interconnecting arrangement between hub and shaft adds weight and its manufacture is expensive. After assembly and tightening of the elements against each other, stresses arise which are difficult to predict but which, in operation, have been found to decrease the overall strength of the coupling.

It is an object of the present invention to provide an interconnecting arrangement between a shaft and a hub which is simple, can be made in small dimensions, is of low weight and is capable of transmitting substantial torques; and which is easily centered and has good dynamic balance.

SUBJECT MATTER OF THE PRESENT INVENTION

Briefly, a pair of holding rings are provided, having counter-directed frustro-conical surfaces. One ring, the inner one, has an outer conical surface whereas an outer ring, adapted to seat thereover, has an inner conical surface. In accordance with the invention, the thicker ends of each of the rings are formed with cylindrical centering rings extending over the thinner ends of the other ring, in overlapping relationship, and, for example, up to the shaft and to the outer diameter of the outer ring, or even therebeyond. The cylindrical centering rings, therefore, provide excellent centricity, and thus high stability and dynamic balance. The torque-transmission capabilities likewise are high. The centering rings can be used to center the hub on the shaft, and additionally to locate the hub longitudinally on the shaft. Extending the centering ring of the inner holding ring beyond the diameter of the outer holding ring can provide a locating shoulder for the hub itself, thus increasing the accuracy of the centricity of the hub with respect to the shaft and substantially improving the overall dynamic balance of the shaft with the hub, and its associated wheel thereon.

The invention will be described by way of example with reference to the accompanying drawings, wherein.

Figure 2:
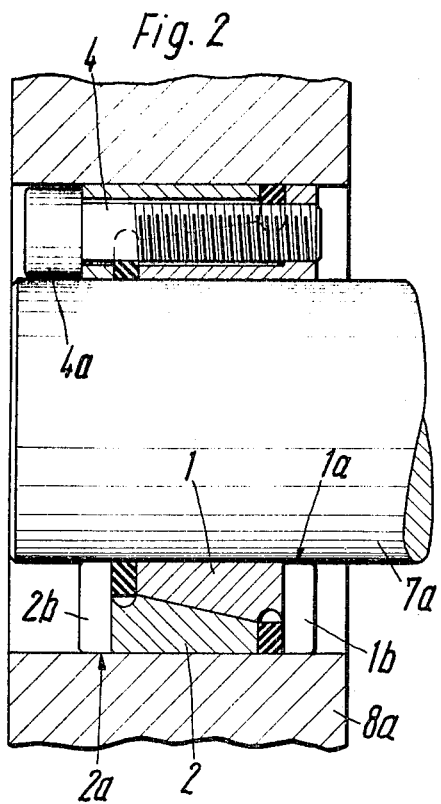
FIG. 2 is a modified form of interconnection between a shaft and a hub utilizing circumferentially arranged screws, the section of FIG. 2 being taken along lines B—B of FIG. 3.
Figure 3:
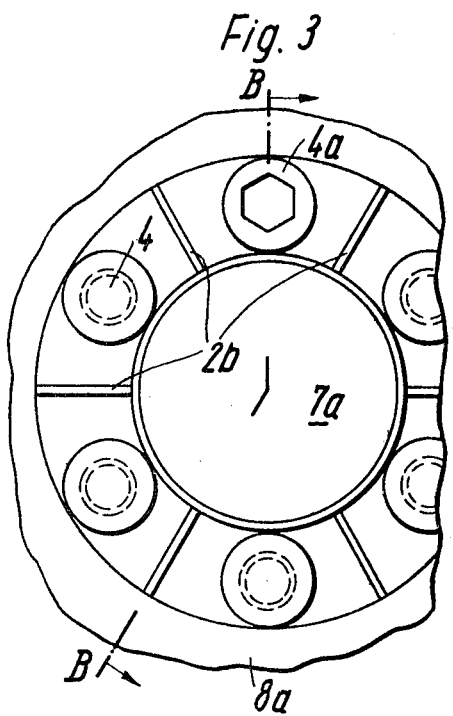

and FIG. 3 is a partial front view of the arrangement of FIG. 2.

Figure 1:
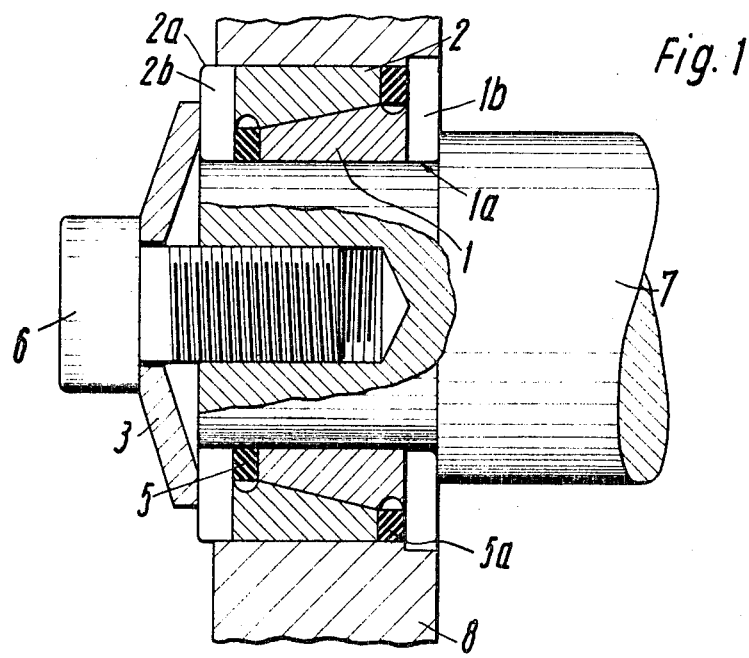
FIG. 1 is a schematic vertical view, partly in section, with portions broken away, and illustrating the attachment arrangement of a hub on a shaft, with a centrally arranged holding bolt.

The hub-to-shaft connecting arrangement in accordance with FIG. 1 comprises an inner ring 1, for example a solid, closed ring, having an outer frustro-conical surface. It is surrounded by a closed outer holding ring 2, having corresponding frustro-conical surfaces. Centering cylinders 1a, 2a are connected, or attached to the thicker ends of the holding rings 1, 2 respectively. The inner diameter of these holding rings is so arranged that it just fits over the shaft to seat, centered, on the shaft 7 without noticable play. The outer diameter of the centering ring 2a attached to holding ring 2 is preferably of the same diameter as the inner diameter of hub 8, to provide a centering surface therefor and seat therein without any substantial play. The outer diameter of the centering ring 1a may also have the same diameter as the centering ring 2a; as seen in FIG. 1, however, it may be slightly larger and fit against a recessed shoulder formed in the hub 8 so that it will act not only as a centering ring, but, additionally, as a locating ring to locate the hub 8 in axial direction on shaft 7. Thus, the outer diameter of centering ring 1a may be slightly greater than the inner diameter of the hub.

The cylindrical centering rings 1a, 2a are preferably formed with radial slits 1b, 2b. These slits may extend, axially, for the full length of the radial centering cylinders 1a, 2a, and, if desired, further within the holding rings up to about half the radial distance of the holding rings 1, 2 respectively. Disks 5, 5a, of rubber, plastic, or other similar and elastic material can be arranged between the inner end faces of a cylindrical centering ring and the opposed end face of the other holding ring.

The entire assembly is secured together and held on shaft 7 by means of a central bolt 6, for example a hex-bolt, which by means of an interposed disk spring 3 presses the rings 1, 1a, 2, 2a against each other by applying an axial force thereagainst. Spring 3 is formed with plane surfaces where the bolt 6 bears thereagainst, and also where it bears against the centering ring 2a, which provides a loading surface therefor. The radial forces caused by the axial pressure due to stressing of the spring 3 provides for positive torque transmission between shaft 7, the rings, and hub 8. The flat bearing surfaces of spring 3 insure that the hexagonal head bolt 6 will not become loose under operation.

The interconnection illustrated in FIG. 2 is similar to that of FIG. 1, except that the inner and outer holding rings 1, 2, are held together by a plurality of circumferentially arranged Allen-head screws 4. The heads 4a of the Allen-head screws are arranged between the hub 8a and shaft 7a without substantial clearance. Upon tightening of the screws 4, the two holding rings 1, 2, together with the cylindrical centering rings 1a, 2a are moved against each other. Thus, radial force will be exerted by sliding over the conical surfaces. Depending on the force being applied by tightening the screws, the radial pressure will provide a corresponding torque transmission between the shaft 7a, the rings 1, 1a, 2, 2a of the hub fastening arrangement, and hub 8a. Thus, substantial torques can be transmitted although the specific surface loading of the areas between the rings 1, 2, may be small. Use of circumferentially arranged Allen-head screws 4 provides for a simple, self-contained hub attachment unit. It is of advantage to interpose disks of rubber of plastic similar to disks 5, 5a also in the construction of FIG. 2, as shown.

The shaft 7a, as well as the hub 8a can be entirely smooth and no additional machining, such as a central hole to accept bolt 6, is necessary. Thus, the hub 8a can be mounted on the shaft in any desired position, and further lessens the cost of manufacture.

The present invention has been illustrated in connection with the mounting of a hub, of any kind, on a shaft the invention is applicable to all kinds of gears, wheels, and the like to be carried on a shaft and the structure to which the hub is attached, or of which it forms a part, can be of any kind.

I claim:

1. A hub-to-shaft connection having a frustro-conical inner holding ring (1) adapted to seat on the shaft (7), and a closed outer holding ring (2) having a frustro-conical inner surface matching the outer surface of said frusto-conical inner ring (1), said connection comprising a cylindrical centering ring (1a) adapted to seat against a surface of the hub formed on the thicker end of said inner holding ring and extending over a radial distance greater than the thickness of said thicker end and overlapping the thinner end of the outer holding ring;

and a cylindrical centering ring (2a) adapted to seat against the inner surface of the hub and formed at the thicker end of said outer holding ring and extending over a radial distance greater than the thickness of said thicker end and overlapping the thinner end of the inner holding ring (1), said centering rings being provided to center a respective inner, or outer holding ring on the shaft, and within the hub (8), the outer diameter of the centering ring (1a) formed on the thicker end of the inner holding ring (1) having a diameter which is greater than the diameter of the centering ring (2a) formed on the outer holding ring (2).

2. Connection according to claim 1 wherein at least one of the centering rings has radially extending slits (1b, 2b) formed thereon starting from an end face of the respective one of said rings.

3. Connection according to claim 2 wherein the radially extending slits formed in the centering rings continue into the holding ring on which the centering ring is formed, said slits formed in the holding rings extending for a distance up to about one half of the axial length of the holding rings.

4. Connection according to claim 1 including disks of elastic material (5, 5a), located between at least one end face of a holding ring (1) and the inner end face of an opposed centering ring (2a) formed on the other holding ring (2).

5. Connection according to claim 1 including a disk spring (3) having a plane bearing surface, and means (6) securing said disk spring on the shaft and pressing said disk spring against one of said centering rings formed on one of said holding rings with said plane bearing surface.

6. Connection according to claim 4 wherein the elastic material includes rubber.

7. Connection according to claim 4 wherein the elastic material includes plastic.

8. Connection according to claim 4 wherein the elastic material includes an elastomer material.

* * * * *